(12) United States Patent  
Iwane et al.

(10) Patent No.: US 9,497,403 B2
(45) Date of Patent: Nov. 15, 2016

(54) SOLID-STATE IMAGING APPARATUS AND CAMERA

(71) Applicant: CANON KABUSHIKI KAISHA, Tokyo (JP)

(72) Inventors: Masaaki Iwane, Sagamihara (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 14/255,133

(22) Filed: Apr. 17, 2014

(65) Prior Publication Data

US 2014/0333815 A1 Nov. 13, 2014

(30) Foreign Application Priority Data

May 10, 2013 (JP) ................................ 2013-100703

(51) Int. Cl.
*H04N 5/378* (2011.01)
*H04N 5/369* (2011.01)
*H04N 3/14* (2006.01)

(52) U.S. Cl.
CPC .............. *H04N 5/378* (2013.01); *H04N 3/155* (2013.01); *H04N 5/369* (2013.01); *H04N 5/3698* (2013.01)

(58) Field of Classification Search
CPC .......................... H04N 5/378; H04N 5/3698
USPC ............... 348/294, 302, 308, 311; 250/208.1
See application file for complete search history.

(56) References Cited

U.S. PATENT DOCUMENTS

| 6,534,336 | B1 | 3/2003 | Iwane et al. |
| 7,187,052 | B2 | 3/2007 | Okita et al. |
| 7,283,305 | B2 | 10/2007 | Okita et al. |
| 7,294,818 | B2 | 11/2007 | Matsuda et al. |
| 7,321,110 | B2 | 1/2008 | Okita et al. |
| 7,355,645 | B2 | 4/2008 | Sakurai et al. |
| 7,408,210 | B2 | 8/2008 | Ogura et al. |
| 7,456,880 | B2 | 11/2008 | Okita et al. |
| 7,460,162 | B2 | 12/2008 | Koizumi et al. |
| 7,466,003 | B2 | 12/2008 | Ueno et al. |
| 7,468,750 | B2 * | 12/2008 | Mabuchi .............. H04N 5/3559 250/208.1 |
| 7,514,732 | B2 | 4/2009 | Okita et al. |
| 7,531,885 | B2 | 5/2009 | Okita et al. |
| 7,538,804 | B2 | 5/2009 | Okita et al. |
| 7,538,810 | B2 | 5/2009 | Koizumi et al. |
| 7,550,793 | B2 | 6/2009 | Itano et al. |
| 7,557,847 | B2 | 7/2009 | Okita et al. |

(Continued)

FOREIGN PATENT DOCUMENTS

JP 2003-032548 A 1/2003

*Primary Examiner* — Twyler Haskins
*Assistant Examiner* — Akshay Trehan
(74) *Attorney, Agent, or Firm* — Fitzpatrick, Cella, Harper & Scinto (57) ABSTRACT

A solid-state imaging apparatus including a pixel array, the column signal lines, arranged so as to correspond to each column of the pixel array, for reading out signals from the pixel array, the current sources, for supplying currents corresponding to potentials of controlling terminals of the current sources to the column signal lines, and a supplying unit for supplying a first potential and a second potential to the controlling terminals, wherein in a first mode for reading out the signals from the pixel array, the supplying unit supplies the first potential to the controlling terminals, and in a second mode for stopping the reading out, the supplying unit supplies the second potential to the controlling terminals, and the currents supplied by the current sources of the second mode is smaller than that of the first mode.

15 Claims, 10 Drawing Sheets

(56) References Cited

U.S. PATENT DOCUMENTS

| | | |
|---|---|---|
| 7,646,493 B2 | 1/2010 | Okita et al. |
| 7,688,377 B2 | 3/2010 | Matsuda et al. |
| 7,872,286 B2 | 1/2011 | Okita et al. |
| 7,935,995 B2 | 5/2011 | Watanabe et al. |
| 7,978,241 B2 | 7/2011 | Koizumi et al. |
| 7,986,362 B2 | 7/2011 | Sakurai et al. |
| 8,009,213 B2 | 8/2011 | Okita et al. |
| 8,063,958 B2 | 11/2011 | Okita et al. |
| 8,089,545 B2 | 1/2012 | Koizumi et al. |
| 8,106,955 B2 | 1/2012 | Okita et al. |
| 8,111,311 B2 | 2/2012 | Iwane |
| 8,134,190 B2 | 3/2012 | Okita et al. |
| 8,139,133 B2 | 3/2012 | Iwane et al. |
| 8,158,920 B2 | 4/2012 | Suzuki et al. |
| 8,159,573 B2 | 4/2012 | Suzuki et al. |
| 8,199,235 B2 | 6/2012 | Okita et al. |
| 8,222,682 B2 | 7/2012 | Watanabe et al. |
| 8,278,613 B2 | 10/2012 | Okita et al. |
| 8,325,260 B2 | 12/2012 | Yamazaki et al. |
| 8,345,137 B2 | 1/2013 | Shinohara et al. |
| 8,390,708 B2 | 3/2013 | Koizumi et al. |
| 8,421,894 B2 | 4/2013 | Koizumi et al. |
| 8,427,567 B2 | 4/2013 | Okita et al. |
| 8,441,558 B2 | 5/2013 | Okita et al. |
| 8,525,896 B2 | 9/2013 | Okita et al. |
| 8,553,101 B2 * | 10/2013 | Okita ............... H04N 5/23245 348/220.1 |
| 8,553,120 B2 | 10/2013 | Sakurai et al. |
| 8,643,765 B2 | 2/2014 | Takada et al. |
| 8,698,935 B2 | 4/2014 | Okita et al. |
| 8,749,675 B2 | 6/2014 | Koizumi et al. |
| 8,749,683 B2 | 6/2014 | Minowa et al. |
| 2001/0008268 A1 * | 7/2001 | Funakoshi ........... H04N 5/3658 250/208.1 |
| 2003/0146993 A1 * | 8/2003 | Kokubun .............. H04N 5/363 348/308 |
| 2007/0146514 A1 * | 6/2007 | Maeda .................. H04N 5/3456 348/294 |
| 2008/0273093 A1 * | 11/2008 | Okita .................. H04N 5/23245 348/220.1 |
| 2010/0182465 A1 | 7/2010 | Okita |
| 2011/0074993 A1 | 3/2011 | Okita et al. |
| 2012/0199724 A1 * | 8/2012 | Nomura ............... H04N 5/3454 250/208.1 |
| 2012/0235021 A1 * | 9/2012 | Kasai ................. H04N 5/35527 250/208.1 |
| 2012/0262592 A1 * | 10/2012 | Rabii ................. H04N 5/23241 348/208.16 |
| 2012/0307100 A1 | 12/2012 | Iwane |
| 2013/0063639 A1 | 3/2013 | Yamazaki et al. |
| 2013/0083225 A1 | 4/2013 | Minowa et al. |
| 2013/0113966 A1 | 5/2013 | Arishima et al. |
| 2013/0140665 A1 | 6/2013 | Koizumi et al. |
| 2013/0147997 A1 * | 6/2013 | Naganokawa ........ H01L 27/148 348/302 |
| 2013/0181118 A1 | 7/2013 | Koizumi et al. |
| 2013/0194468 A1 | 8/2013 | Okita |
| 2013/0222631 A1 | 8/2013 | Iwane et al. |
| 2014/0002684 A1 | 1/2014 | Okita et al. |
| 2014/0002689 A1 | 1/2014 | Sakurai et al. |
| 2014/0036121 A1 | 2/2014 | Minowa et al. |

* cited by examiner

SOLID-STATE IMAGING APPARATUS AND CAMERA

BACKGROUND OF THE INVENTION

Field of the Invention

The present invention relates to a solid-state imaging apparatus, and a camera including the same.

Description of the Related Art

A solid-state imaging apparatus can include a pixel array in which a plurality of pixels are arranged, and a plurality of column signal lines arranged to correspond to the respective columns of the pixel array. A transistor for reading out a signal can be arranged in each pixel, and a current source can be connected to each column signal line. A source follower circuit is formed by the transistor and the current source, and is used to read out a signal from each pixel.

In an arrangement in which even while a signal readout operation from the pixel array is paused, a current source supplies a current as in a signal readout operation, power is wastefully consumed. To solve this problem, an arrangement of controlling the current amount of the current source depending on an operation mode (a mode in which a signal readout operation from the pixel array is performed and a mode in which the readout operation is paused) can be adopted. However, as the number of pixels increases, a wiring capacitance for controlling the current source increases, thereby degrading the responsiveness of the control.

SUMMARY OF THE INVENTION

The present invention provides a technique advantageous in controlling a pixel signal readout mode and pause mode of a solid-state imaging apparatus.

One of the aspects of the present invention provides a solid-state imaging apparatus including a pixel array in which a plurality of pixel units are arranged to form a plurality of rows and a plurality of columns, a plurality of column signal lines arranged to respectively correspond to the plurality of columns and configured to read out signals from the pixel array, and a plurality of current sources arranged to respectively correspond to the plurality of column signal lines and configured to supply currents corresponding to potentials of controlling terminals of the current sources to the plurality of column signal lines, respectively, the apparatus, comprising a first potential generation unit configured to generate a first potential, a second potential generation unit configured to generate a second potential different from the first potential, and a switch unit configured to, in a first mode in which a signal readout operation from the pixel array is performed, connect an output of the first potential generation unit to each of the controlling terminals to set the potential of the controlling terminal to the first potential, and in a second mode in which the signal readout operation is paused, connect an output of the second potential generation unit to each of the controlling terminals to set the potential of the controlling terminal to the second potential, wherein before the potential of the controlling terminal reaches the first potential, the first potential generation unit supplies, to the controlling unit via the switch unit, a current larger than that when the potential reaches the first potential, and before the potential of the controlling terminal reaches the second potential, the second potential generation unit supplies, to the controlling unit via the switch unit, a current larger than that after the potential reaches the second potential.

Further features of the present invention will become apparent from the following description of exemplary embodiments with reference to the attached drawings.

DESCRIPTION OF THE EMBODIMENTS

<First Embodiment>

Figure 1:
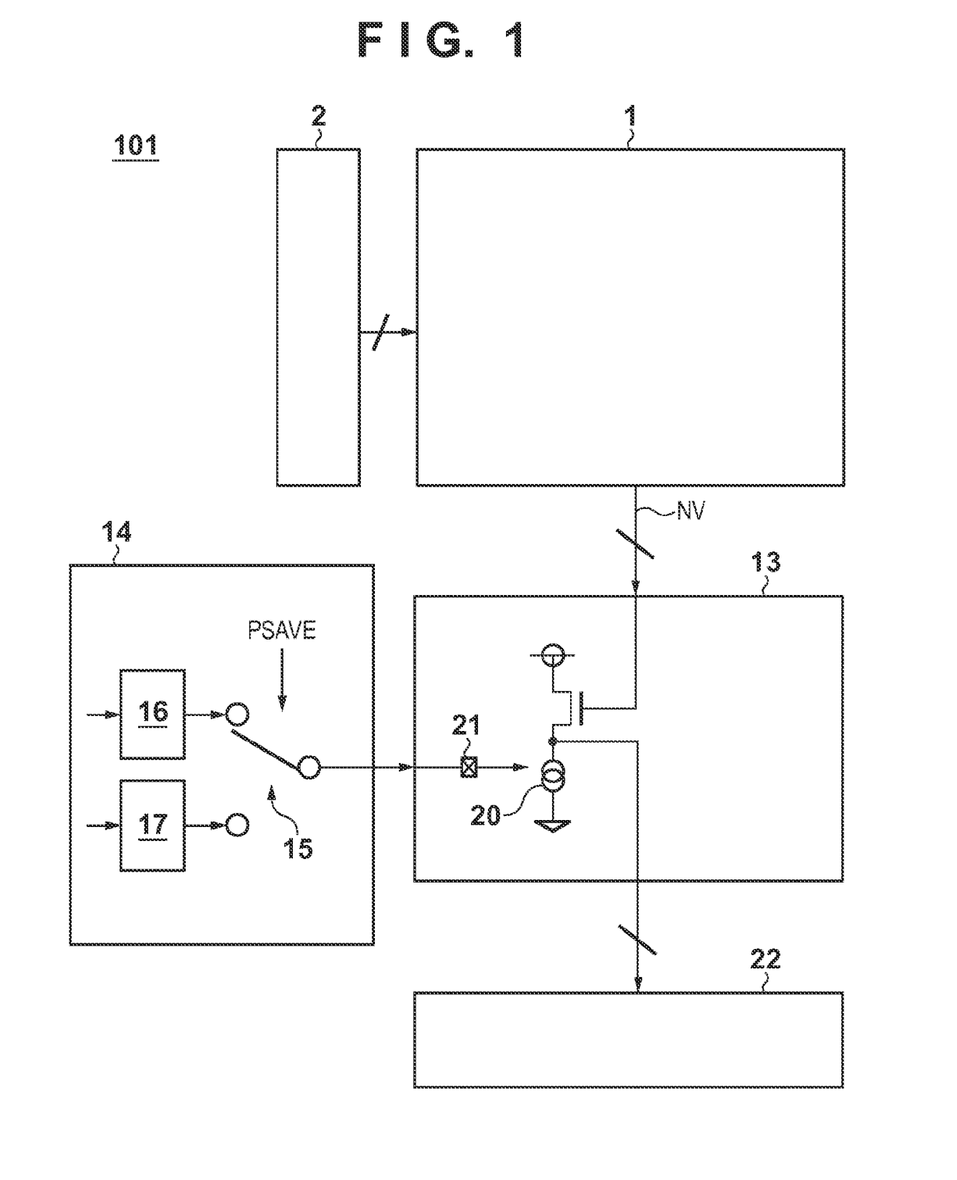
FIG. 1 is a block diagram for explaining an example of an arrangement according to the first embodiment.
Figure 2:
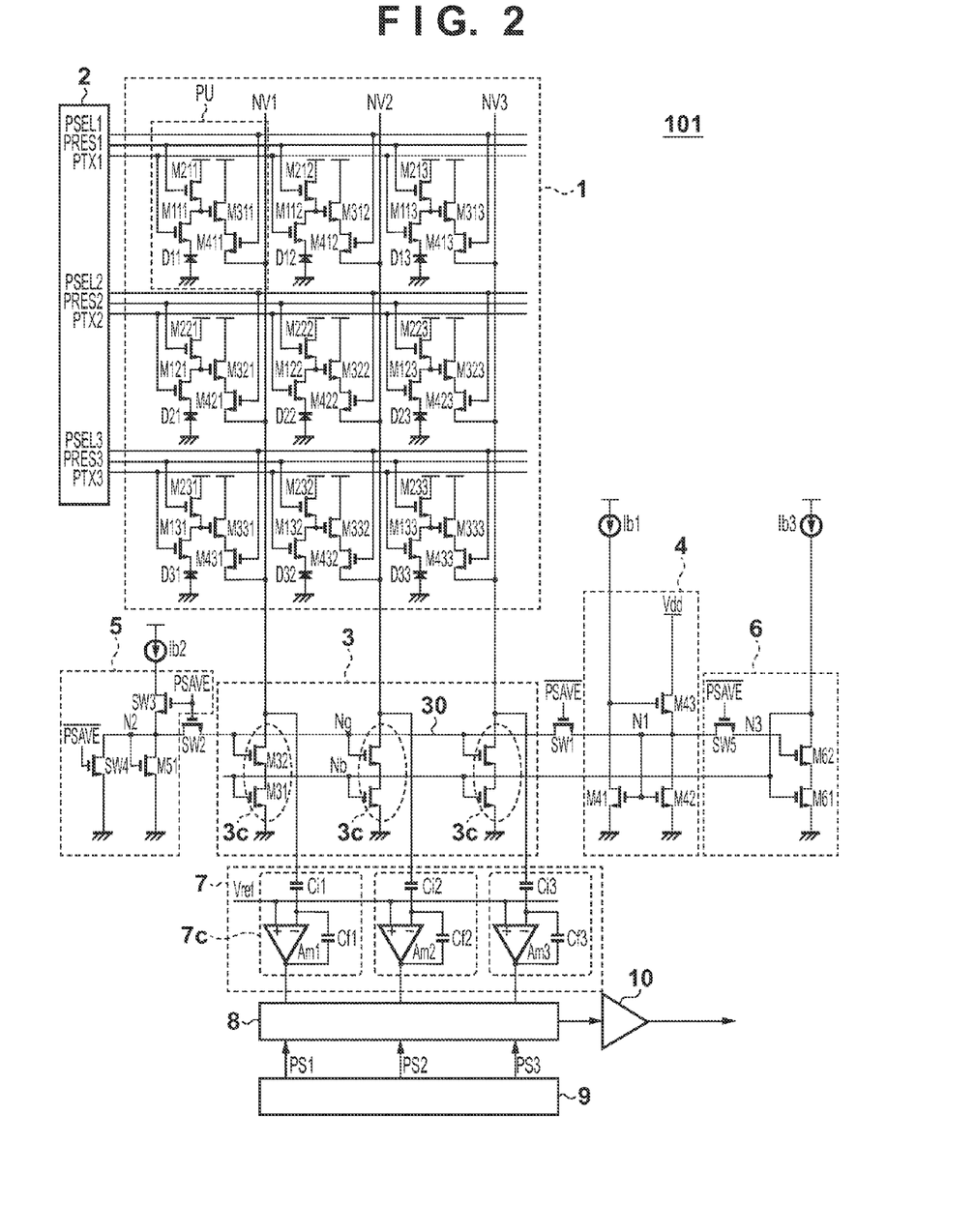
FIG. 2 is a circuit diagram for explaining a practical example of the arrangement according to the first embodiment.
Figure 3:
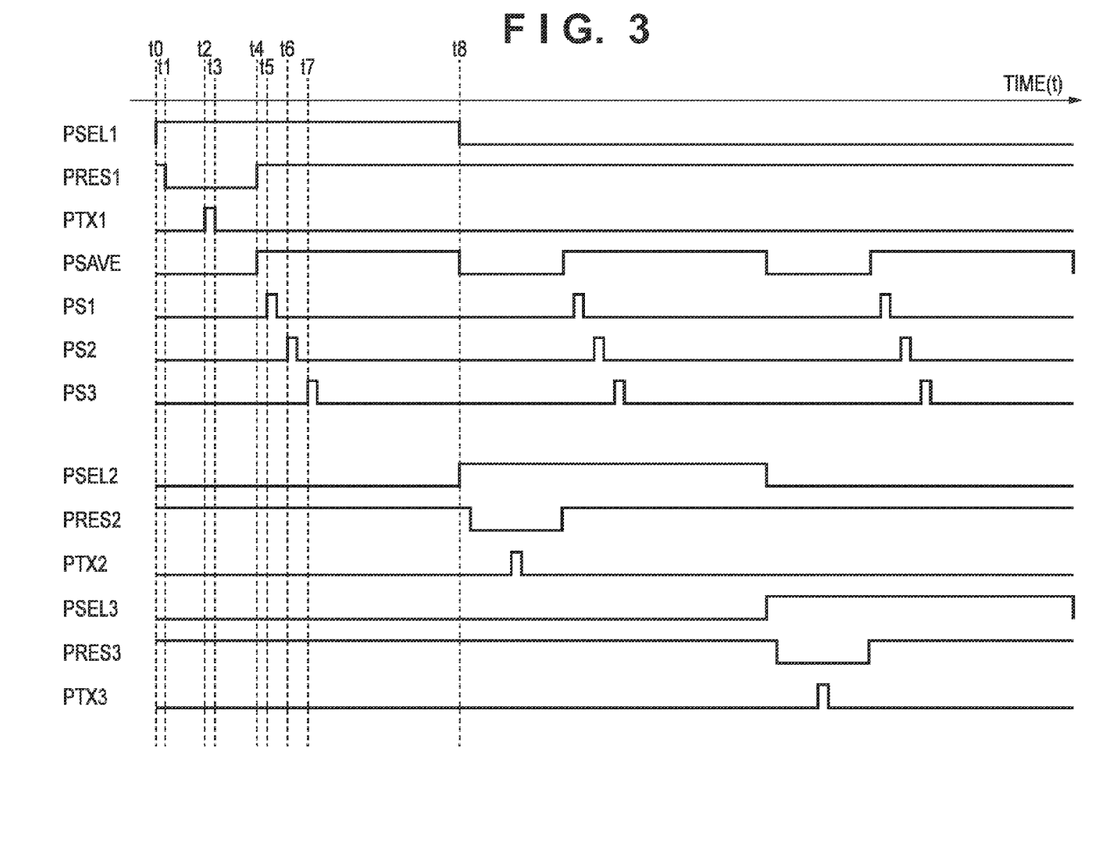
FIG. 3 is a timing chart for explaining a practical example of the arrangement according to the first embodiment.

A solid-state imaging apparatus 101 according to the first embodiment will be described with reference to FIGS. 1 to 3. FIG. 1 is a block diagram for explaining the arrangement of the solid-state imaging apparatus 101. The solid-state imaging apparatus 101 can include a pixel array 1, a vertical scanning circuit 2, an amplifying unit 13, and a potential generation unit 14. A signal from the pixel array 1 is input to the amplifying unit 13 via a column signal line NV in accordance with a control signal from the vertical scanning circuit 2. After that, the signal is amplified by the amplifying unit 13, and output to a horizontal scanning circuit 22. As exemplified in FIG. 1, the amplifying unit 13 includes a constant current source 20 as part of an arrangement for amplifying the signal from the pixel array 1.

The amplifying unit 13 includes, for example, a controlling terminal 21, and the constant current source 20 is configured to adjust a current amount in accordance with the potential of the controlling terminal 21. One of a first potential $V_{CNT1}$ and a second potential $V_{CNT2}$ which are different from each other is supplied to the controlling terminal 21. The potential generation unit 14 supplies these potentials. In this case, as an example of the arrangement of the potential generation unit 14, a switch unit 15, a first potential generation unit 16, and a second potential generation unit 17 are shown. More specifically, for example, the first potential generation unit 16 outputs the first potential $V_{CNT1}$ and the second potential generation unit 17 outputs the second potential $V_{CNT2}$. The switch unit 15 is configured to selectively connect one of the output (the first potential $V_{CNT1}$) of the first potential generation unit 16 and the output (the second potential $V_{CNT2}$) of the second potential generation unit 17 to the controlling terminal 21 in accordance with a control signal PSAVE.

In a first mode in which a signal readout operation from the pixel array 1 is performed, the potential generation unit 14 of the solid-state imaging apparatus 101 supplies the first potential $V_{CNT1}$ to the controlling terminal 21. In a second mode in which a signal readout operation from the pixel array 1 is paused, the potential generation unit 14 of the solid-state imaging apparatus 101 supplies the second potential $V_{CNT2}$ to the controlling terminal 21. As described above, the solid-state imaging apparatus 101 can be configured so that the current of the constant current source 20 has a value smaller in the second mode than in the first mode. By adopting such arrangement, the solid-state imaging apparatus 101 can reduce the power consumption.

A practical example of the arrangement will be described below with reference to FIG. 2. FIG. 2 is a circuit diagram for explaining a practical example of the arrangement of the solid-state imaging apparatus 101. The pixel array 1 includes a plurality of pixel units PU which are arranged to form a plurality of rows and a plurality of columns. In this example, the pixel units PU arranged in 3 rows×3 columns are shown for the sake of simplicity. However, for example, the number of columns is actually a scale of several thousand to several ten thousand columns. For example, the pixel unit PU on the first row and the first column includes a photoelectric conversion unit D11 (for example, a photodiode), a transfer transistor M111, a reset transistor M211, a source follower transistor M311, and a selection transistor M411. As the transistors M111 to M411, for example, NMOS transistors can be used. A control signal PTX1 is supplied to the gate terminal of the transfer transistor M111. When the control signal PTX1 is activated, the transfer transistor M111 transfers charges which have been generated and accumulated in the photoelectric conversion unit D11 upon receiving light. This changes the potential of the gate terminal of the source follower transistor M311. The amount of a current flowing through the source follower transistor M311 can change in accordance with this potential change. A control signal PSEL1 is supplied to the gate terminal of the selection transistor M411. When the control signal PSEL1 is activated, the selection transistor M411 outputs a signal corresponding to the current amount of the source follower transistor M311 to the column signal line NV. Furthermore, a control signal PRES1 is supplied to the gate terminal of the reset transistor M211. When the control signal PRES1 is activated, the reset transistor M211 can reset the potential of the gate terminal of the source follower transistor M311. The same goes for other pixel units PU.

A plurality of column signal lines NV (NV1 to NV3) are arranged to correspond to the respective columns of the pixel array 1. The solid-state imaging apparatus 101 includes a column current source 3 in which a plurality of current sources 3c are arranged to correspond to the respective column signal lines NV. Each current source 3c is configured by, for example, cascode-connecting a plurality of MOS transistors. In this example, each current source 3c is formed by MOS transistors M31 and M32. The gate terminal of the MOS transistor M32 corresponds to the controlling terminal 21 shown in FIG. 1. The gate terminal of each MOS transistor M32 is connected to a common control signal line 30 (a node Ng). Each current source 3c supplies a current corresponding to the potential of its controlling terminal 21 (that is, the potential of the control signal line 30) to the corresponding column signal line NV. The solid-state imaging apparatus 101 also includes a column amplifier group 7 in which a plurality of column amplifiers 7c are arranged to correspond to the respective column signal lines NV. Each column amplifier 7c is formed by, for example, a differential amplifier Am, an input capacitor Ci, and a feedback capacitor Cf, and amplifies and outputs a change in potential of the corresponding column signal line NV. The column amplifier group 7 corresponds to the constant current source 20 included in the amplifying unit 13 shown in FIG. 1. After that, the respective pixel signals amplified by the column amplifier group 7 are stored in a line memory 8, and undergo horizontal transferring to an output unit 10 in accordance with control signals PS1 to PS3 input from a horizontal shift register 9. The line memory 8, horizontal shift register 9, and output unit 10 correspond to the horizontal scanning circuit 22 shown in FIG. 1.

To read out a signal from each pixel unit PU, in the input capacitor Ci of each column amplifier 7c, an output when the reset transistor M211 or the like performs a reset operation is clamped in advance as a noise component (first signal). Subsequently, each column amplifier 7c outputs the difference between the noise component and a signal (second signal) read out in response to transferring of charges, thereby processing, as a pixel signal, a signal in which the noise component has been removed. In this way, a pixel signal corresponding to the amount of light incident on each pixel unit PU is read out from the pixel array 1.

The solid-state imaging apparatus 101 includes, as the potential generation unit 14, a unit 4 corresponding to the first potential generation unit 16 and a unit 5 corresponding to the second potential generation unit 17. Furthermore, in this example, a unit 6 is arranged as a third potential generation unit to supply a potential to the gate terminal (node Nb) of each MOS transistor M31 (one of the cascode-connected MOS transistors).

The unit 4 includes, for example, MOS transistors M41 to M43 which form a current mirror. A bias current source Ib1 supplies a constant current (for example, about 50 to 200 μA) to the MOS transistor M41. This causes the unit 4 to generate a first potential $V_{CNT1}$ (for example, about 2 V) at a node N1. The node N1 is connected to the node Ng via a switch SW1 (first switch unit). The unit 5 includes, for example, a MOS transistor M51 and switches SW3 and SW4. A bias current source Ib2 supplies a constant current (for example, about 50 to 200 μA) to the MOS transistor M51 via the switch SW3. According to the relationship between the MOS transistor M51 and the current amount of the bias current source Ib2, a second potential $V_{CNT2}$ (for example, about 0.8 V) is generated at a node N2. The node N2 is connected to the node Ng via a switch SW2 (second switch unit). Furthermore, the unit 6 includes, for example, MOS transistors M61 and M62. A bias current source Ib3 supplies a constant current (for example, about 50 to 200 μA) to the MOS transistor M62. The gate terminal (node N3) of the MOS transistor M62 is connected to the node N1 via a switch SW5. The gate terminal of the MOS transistor M61 is connected to the gate terminal of the MOS transistor M31 of each current source 3c (the node Nb). The arrangement of the units 4 to 6 is not limited to this embodiment, and the units 4 to 6 need only be configured to generate desired potentials. As the values of the first potential $V_{CNT1}$ and the second potential $V_{CNT2}$, it is only necessary to set, for example, the first potential $V_{CNT1}$ to about 2 V and the second potential $V_{CNT2}$ to about 0.8 V by setting a power supply voltage VDD to be applied to the solid-state imaging apparatus to about 3 to 5 V.

In the first mode, the switches SW1, SW4, and SW5 are rendered conductive and the switches SW2 and SW3 are rendered non-conductive. This sets the potential of the node Ng and that of the gate terminal of the MOS transistor M62 to the first potential $V_{CNT1}$. Accordingly, a potential corresponding to the amount of a current flowing through the unit 6 is supplied to the node Nb. As a result, each current source 3c supplies a current of an amount corresponding to the first potential $V_{CNT1}$ to the corresponding column signal line NV. If, for example, the current value of the bias current source Ib3 is 100 μA, and the gate width of the MOS transistors M31 and M32 is 1/20 that of the MOS transistors M61 and M62, the amount of a current flowing through each current source 3c is 5 μA. With respect to the switches SW1 and SW5, it is preferable that the switch SW5 is rendered conductive after the switch SW1 is rendered conductive. By shifting the timings when the switches SW1 and SW5 are rendered conductive from each other, it is possible to reduce the influence, on the unit 6 (the potential of the node N3), of a change in potential of the node N1 immediately after the switch SW1 is rendered conductive. As another measure against this, for example, a capacitor of about 10 to 100 pF may be connected to the node N3 with respect to the ground potential, thereby suppressing a change in potential of the node N3. On the other hand, if the above-described influence on the unit 6 is sufficiently small, the nodes N1 and N3 may be short-circuited without using the switch SW5.

In the second mode, the switches SW2 and SW3 are rendered conductive and the switches SW1, SW4, and SW5 are rendered non-conductive. This connects the nodes Ng and N2, and sets the potential of the node Ng to the second potential $V_{CNT2}$. In this case, the load capacitance of the node Ng (the wiring capacitance of the control signal line 30, the gate capacitance of the plurality of MOS transistors M32, and the like) is several ten pF or larger. Immediately after the switch SW2 is rendered conductive, the potential of the node N2 changes to a potential almost equal to the first potential $V_{CNT1}$ due to the load capacitance of the node Ng. This causes the MOS transistor M51 to supply a current of an amount corresponding to the difference between the second potential $V_{CNT2}$ and the potential of the gate terminal (node N2), thereby setting the potential of the node Ng to the second potential $V_{CNT2}$. In this way, the amount of a current flowing through each current source 3c is set to, for example, about 5 to 0.5 μA. In this example, in the second mode, the amount of the current flowing through each current source 3c is set to not 0 μA but about 0.5 μA, thereby supplying a small idling current to each current source 3c. With this operation, the difference between the potential of each column signal line NV in the second mode and that in the first mode becomes small, thereby allowing transition from the first mode to the second mode at high speed.

In this embodiment, the unit 4 (corresponding to the first potential generation unit 16) and the unit 5 (corresponding to the second potential generation unit 17) are arranged at opposite positions with respect to the column current source 3. That is, the unit 4 is arranged at one end of the control signal line 30 connected to the controlling terminals 21, and the unit 5 is arranged at the other end of the control signal line 30. This makes it possible to distribute and arrange the units 4 and 5, each of which has an occupation area relatively larger than those of other logic circuits, thereby facilitating layout design. Furthermore, layout design which makes a wiring capacitance generated between the nodes Ng and Nb small suppresses a change in potential of the gate terminal of the MOS transistor M31, and thus each current source 3c can supply a stable current to the corresponding column signal line NV.

According to this embodiment, the units 4 and 5 which supply different potentials to the control signal line 30 are separately arranged. In this embodiment, the unit 4 is configured to include a source follower circuit which is formed by using an NMOS transistor and a current source implemented by a current mirror. The unit 5 is configured to include a source ground circuit which is formed by using the bias current source Ib2 and the NMOS transistor. Each of the units 4 and 5 need only generate a potential for switching the operation mode of the solid-state imaging apparatus 101, and may adopt another arrangement including an amplifying circuit. The switch units (switches SW1 and SW2) selectively connect the output of one of the units 4 and 5 to the control signal line 30.

As described above, the solid-state imaging apparatus 101 is configured so that the current value of each current source 3c becomes smaller in the second mode in which a signal readout operation from the pixel array 1 is paused than in the first mode in which the signal readout operation is performed. This can reduce the power consumption of the solid-state imaging apparatus 101. As described above, according to this embodiment, the solid-state imaging apparatus 101 can effectively reduce its power consumption, and is advantageous in controlling the operation mode.

A method of driving the solid-state imaging apparatus 101 will be described below with reference to a timing chart shown in FIG. 3. The timing chart shows the states of control signals PSEL1 to PSEL3, PRES1 to PRES3, PTX1 to PTX3, PSAVE, and PS1 to PS3.

At time t0, the control signal PSEL1 is set at high level. Consequently, the selection transistor M411 and selection transistors M412 and M413 are rendered conductive, thereby setting each pixel unit PU on the first row of the pixel array 1 in a selected state. Furthermore, at time t0, the control signal PSAVE is at low level and the apparatus is in the first mode in which a signal readout operation from the pixel array 1 is performed.

At time t1, the control signal PRES1 is set at low level, and the reset transistor M211 and reset transistors M212 and M213 are rendered non-conductive. After that, an N signal (the above-described first signal) corresponding to the potential of the gate terminal of each of the source follower transistor M311 and source follower transistors M312 and M313 after the reset operation is read out.

At time t2, the control signal PTX1 is set at high level, and the transfer transistor M111 and transfer transistors M112 and M113 are rendered conductive. This transfers charges accumulated in the photoelectric conversion unit D11 and photoelectric conversion units D12 and D13, thereby changing the potential of the gate terminal of each of the source follower transistors M311, M312, and M313.

At time t4, the signal readout operation from the respective pixel units PU on the first row of the pixel array 1 ends, and the control signal PSAVE is set at high level, thereby transitioning to the second mode in which the readout operation is paused, as described above. The readout pixel signal on each column is stored in the line memory 8, as described above. Furthermore, at time t4, the control signal PRES 1 is set at high level.

At time t4, the signal readout operation from the respective pixel units PU on the first row of the pixel array 1 ends, and the control signal PSAVE is set at high level, thereby transiting to the second mode in which the readout operation is paused, as described above. The readout pixel signal on each column is stored in the line memory 8, as described above. Furthermore, at time t4, the control signal PRES1 is set at high level.

At time t5, the control signal PS1 is set at high level. This performs horizontal transferring for the readout pixel signal on the first column from the line memory 8 to the output unit 10. At time t6, the control signal PS2 is set at high level. This performs horizontal transferring for the readout pixel signal on the second column from the line memory 8 to the output unit 10. At time t7, the control signal PS3 is set at high level. This performs horizontal transferring for the readout pixel signal on the third column from the line memory 8 to the output unit 10. In this way, the pixel signals of the pixel units PU on the first row can be output to a processing unit (not shown) of a succeeding stage for processing signals via the output unit 10.

From time t8, the control signal PSAVE is set at low level, pixel signals are read out from the pixel units PU on the second row, similarly to the pixel signal readout operation from the pixel units PU on the first row during times t0 to t8.

As described above, the solid-state imaging apparatus 101 can be driven so that the current value of each current source 3c becomes smaller in the second mode in which a signal readout operation from the pixel array 1 is paused than in the first mode in which the signal readout operation is performed. Furthermore, in the above description, the potential generation unit 14 supplies the first potential $V_{CNT1}$ when the signal PSAVE is at low level, and supplies the second potential $V_{CNT2}$ when the signal PSAVE is at high level. However, this relationship may be reversed.

<Second Embodiment>

Figure 4:
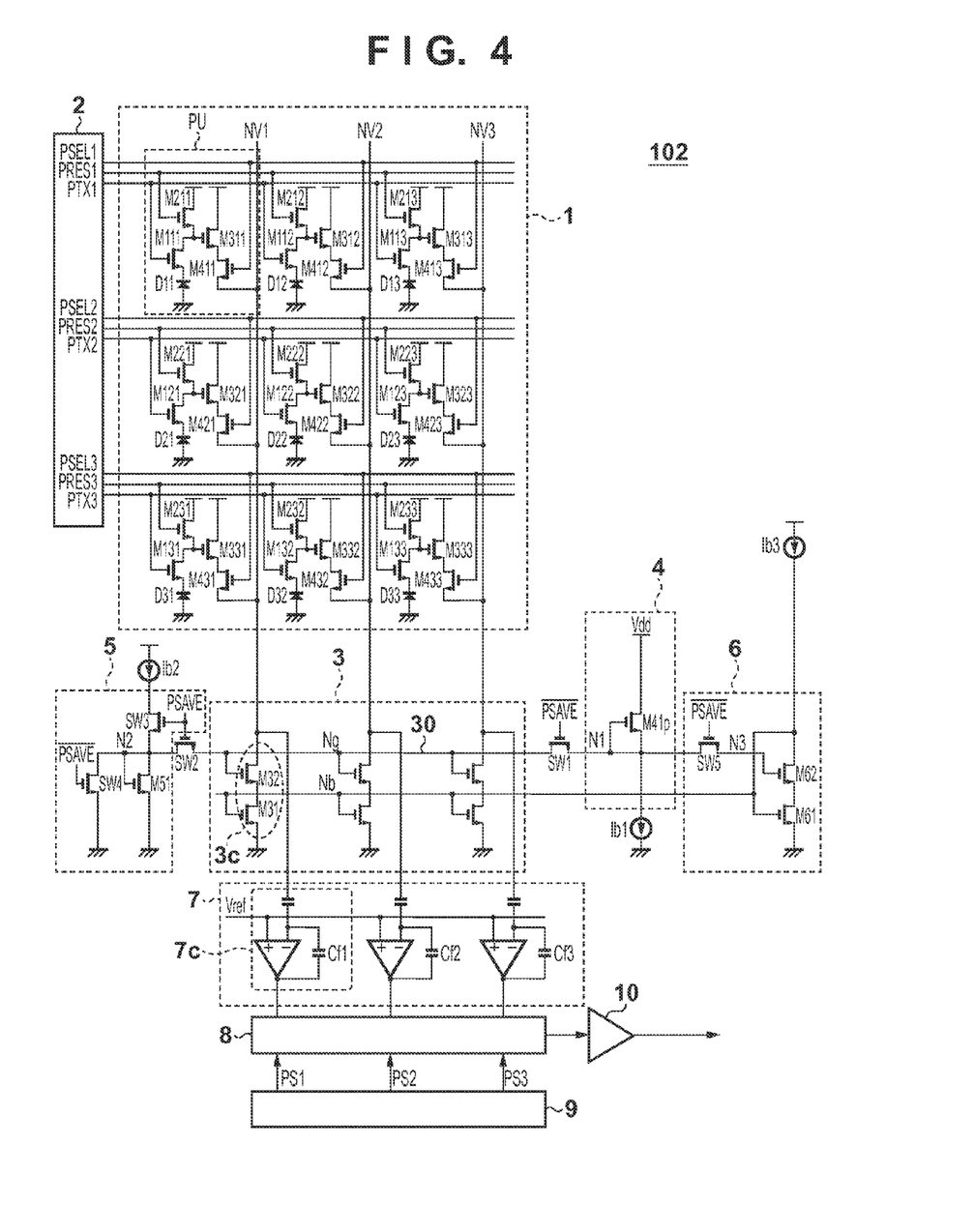
FIG. 4 is a circuit diagram for explaining a practical example of an arrangement according to the second embodiment.

A solid-state imaging apparatus 102 according to the second embodiment will be described with reference to FIG. 4. The second embodiment is different from the first embodiment in that a PMOS transistor M41p is used to form a unit 4 (corresponding to a first potential generation unit 16). The unit 4 of this embodiment generates a first potential $V_{CNT1}$ at a node N1 in accordance with the relationship between a bias current source Ib1 and the unit 4. In this arrangement, as the potential of the node N1 drops below the first potential $V_{CNT1}$, a potential difference $V_{GS}$ between the gate terminal of the PMOS transistor M41p and its source terminal becomes large, thereby increasing the amount of a current flowing through the PMOS transistor M41p. As described above, according to this embodiment, it is possible to obtain the same effects as those in the first embodiment, and transit from the second mode to the first mode at high speed.

<Third Embodiment>

Figure 5:
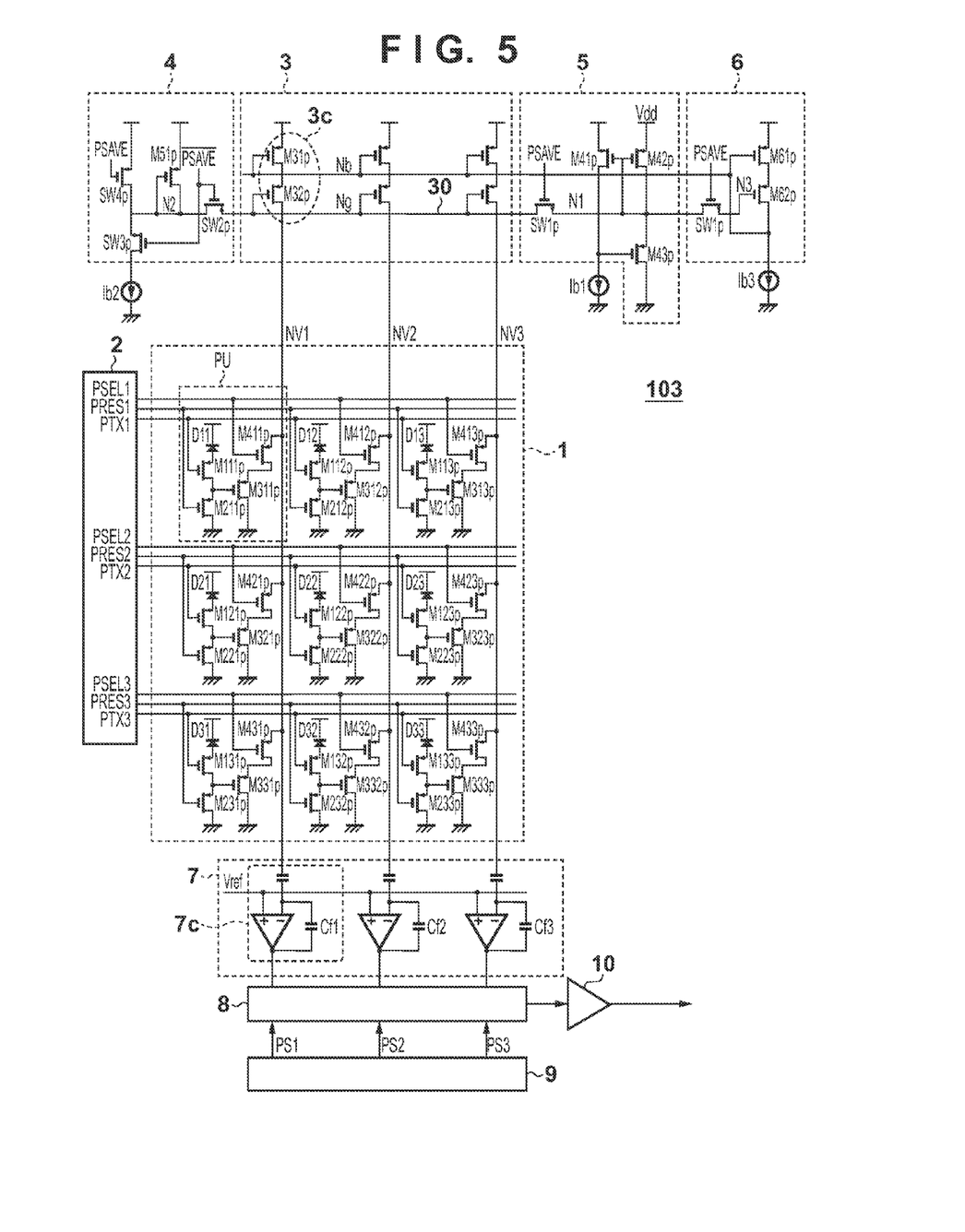
FIG. 5 is a circuit diagram for explaining a practical example of an arrangement according to the third embodiment.

A solid-state imaging apparatus 103 according to the third embodiment will be described with reference to FIG. 5. The third embodiment is different from the first embodiment in that a PMOS transistor is used as a transistor forming the solid-state imaging apparatus 103. In this case, with respect to the operation of the solid-state imaging apparatus 103, the solid-state imaging apparatus 103 has a polarity opposite to that of the solid-state imaging apparatus 101 of the first embodiment. For example, charges accumulated in a pixel array 1 are holes. Referring to FIG. 5, a component for which a PMOS transistor is used is denoted by a reference symbol with "p". Units 4 to 6 need only be designed to supply an appropriate first potential $V_{CNT1}$ and second potential $V_{CNT2}$ (when a power supply voltage VDD=5 V, for example, $V_{CNT1}$=3 V and $V_{CNT2}$=4.2 V). In an aspect in which a PMOS transistor is used as each transistor as in this embodiment, it is also possible to obtain the same effects as those in the first embodiment in which an NMOS transistor is used.

Figure 6:
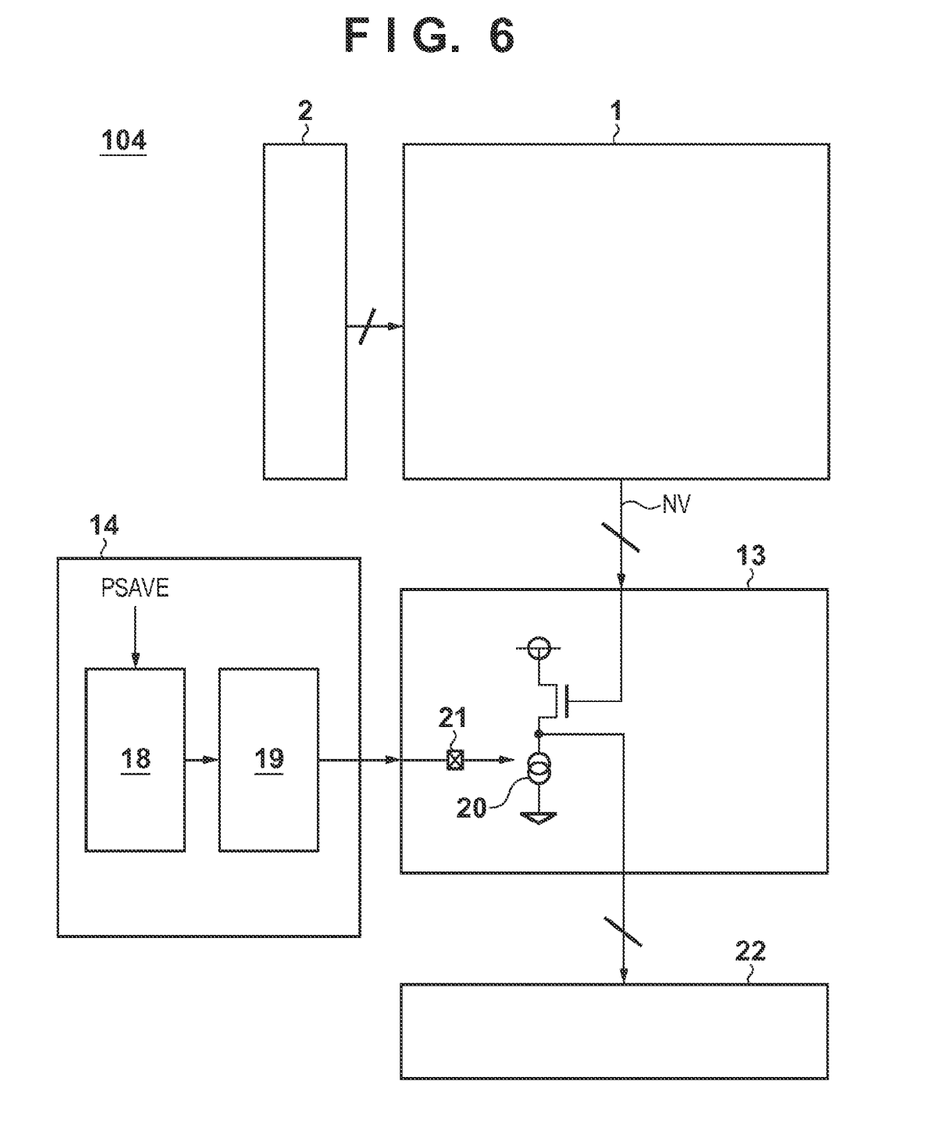
FIG. 6 is a block diagram for explaining another example of the arrangement.
Figure 7:
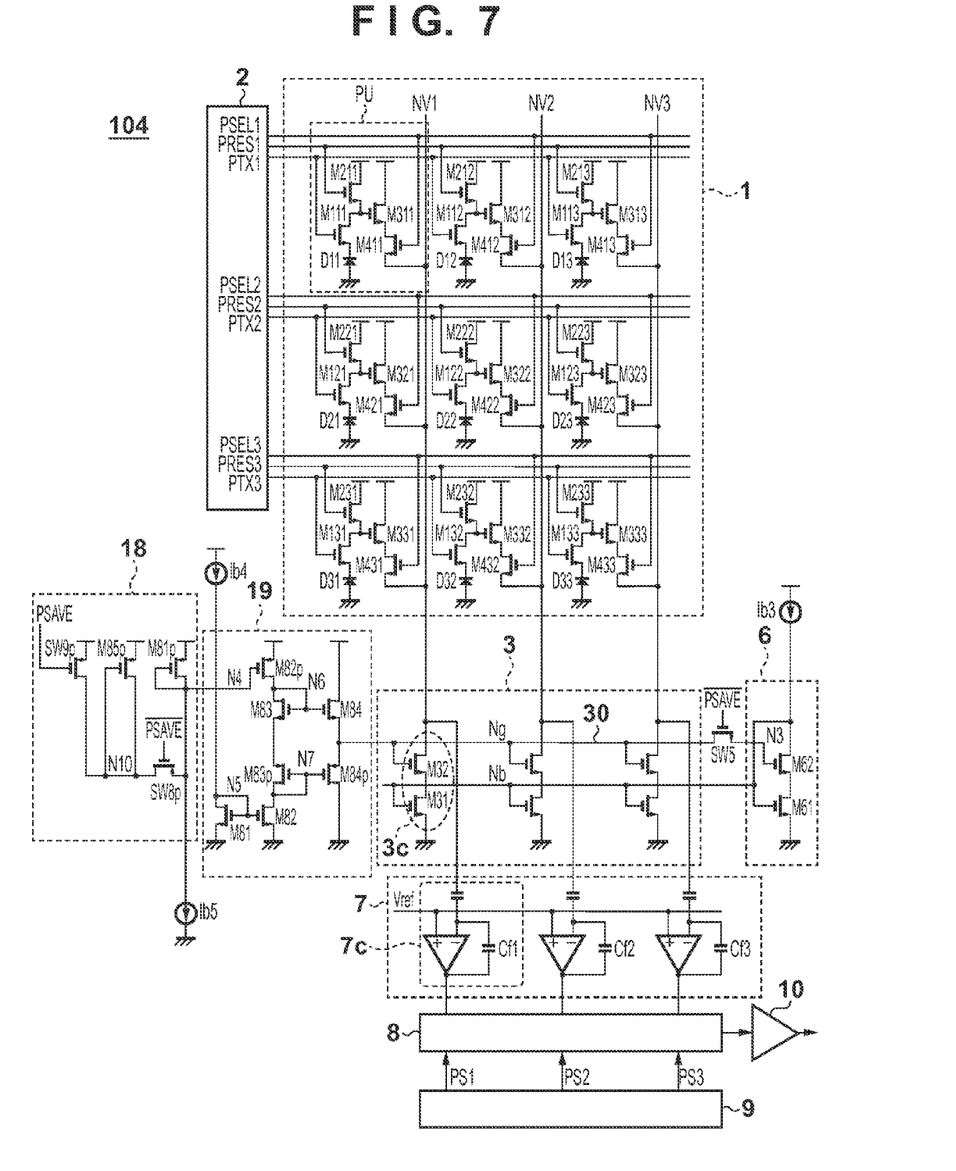
FIG. 7 is a circuit diagram for explaining a practical example of the other arrangement.

A solid-state imaging apparatus 104 will be exemplified below with reference to FIGS. 6 and 7 as an aspect in which both an NMOS transistor and a PMOS transistor are used. The arrangement of the solid-state imaging apparatus 104 is different from that of the solid-state imaging apparatus in each embodiment in that a potential generation unit 14 generates two kinds of potentials by one functional block. FIG. 6 is a block diagram for explaining the arrangement of the solid-state imaging apparatus 104. The potential generation unit 14 can include a switching unit 18 (switch unit) and a potential generation unit 19. The switching unit 18 switches a potential to be generated by the potential generation unit 19 via a node N9 so that the potential generation unit 19 generates the first potential $V_{CNT1}$ in the first mode, and generates the second potential $V_{CNT2}$ in the second mode.

A practical example of the arrangement will be described below with reference to FIG. 7. FIG. 7 is a circuit diagram for explaining a practical example of the arrangement of the solid-state imaging apparatus 104. The switching unit 18 includes PMOS transistors M81p and M85p and switches SW8p and SW9p. The PMOS transistor M81p has a gate terminal and drain terminal which are connected to each other, and can be connected to a bias current source Ib5 (a node N4). The PMOS transistor M85p has a gate terminal and drain terminal which are connected to each other (a node N10), and can be connected to a power supply potential via the switch SW9p. The nodes N4 and N10 can be connected via the switch SW8p.

The potential generation unit 19 includes NMOS transistors M81, M82, M83, and M84, and PMOS transistors M82p, M83p, and M84p. The bias current source Ib5 supplies a constant current to the NMOS transistor M81 having a gate terminal and drain terminal which are connected to each other. The NMOS transistors M81 and M82 form a current mirror (a node N5). According to the relationship between the NMOS transistor M81 and a bias current source Ib4, the potential of the node N5 is set to, for example, about 1 V. A current of an amount corresponding to this potential flows through the NMOS transistor M82. The PMOS transistor M82p, NMOS transistor M83, and PMOS transistor M83p are series-connected to the NMOS transistor M82 on its drain side. The gate terminal of the PMOS transistor M82p is connected to the gate terminal and drain terminal of the PMOS transistor M81p, thereby forming a current mirror with the PMOS transistor M81p (the note N4). The NMOS transistor M84 and the PMOS transistor M84p are series-connected. Furthermore, the NMOS transistors M83 and M84 form a current mirror (a node N6), and the PMOS transistors M83p and M84p form a current mirror (a node N7). The NMOS transistor M84 and PMOS transistor M84p serve as source followers, and their source terminals are connected to a node Ng.

In the first mode (the control signal PSAVE is at low level), the switch SW9p is rendered conductive, the switch SW8p is rendered non-conductive, and the potential of the node N10 is equal to that of the power supply voltage VDD (for example, 5V). On the other hand, according to the relationship between the PMOS transistor M81p and the bias current source Ib5, the potential of the node N4 is set to, for example, about 3.5V. Accordingly, the ON resistance value of the PMOS transistor M82p becomes small, the potential of the node N6 rises to, for example, about 3.0 V, and the potential of the node N7 rises to, for example, about 1.3 V. As a result, the ON resistance value of the NMOS transistor M84 becomes small and the ON resistance value of the PMOS transistor M84p becomes large, thereby setting the potential of the node Ng to, for example, about 2 V (the first potential $V_{CNT1}$).

On the other hand, in the second mode (the control signal PSAVE is at high level), the switch SW9p is non-conductive and the switch SW8p is rendered conductive. This causes the switching unit 18 to supply a current to reduce a current flowing through the PMOS transistor M81p, thereby setting the potential of the node N4 (and the node N10) to, for example, about 4 V. Consequently, the resistance value of the PMOS transistor M82p becomes large, the potential of the node N6 drops to, for example, about 1.8 V, and the potential of the node N7 drops to, for example, about 0.1 V. As a result, the ON resistance value of the NMOS transistor M84 becomes large and the ON resistance value of the PMOS transistor M84p becomes small, thereby setting the potential of the node Ng to, for example, about 0.8 V (the second potential $V_{CNT2}$).

In the second mode, for example, a current of about 20 µA flows through the NMOS transistor M84 and the PMOS transistor M84p. When transitioning from the second mode to the first mode (when changing the potential of the node Ng from 0.8 V to 2 V), the potentials of the nodes N6 and N7 rise, and the NMOS transistor M84 can supply a high current of, for example, about 300 µA. Therefore, the potential of the node Ng rises within a short time, thereby allowing transition from the second mode to the first mode. On the other hand, when transitioning from the first mode to the second mode (when changing the potential of the node Ng from 2 V to 0.8 V), the potentials of the nodes N6 and N7 drop, and the PMOS transistor M84p can supply a high current of, for example, about 300 µA. Therefore, the potential of the node Ng drops within a short time, thereby allowing transition from the first mode to the second mode. Note that the back gate (bulk) of the PMOS transistor M84p is preferably connected to the node Ng. This can suppress a change in threshold potential of the PMOS transistor M84 p due to the substrate bias effect, thereby widening the range (the lowe limit thereof) within which the potential of the node Ng changes.

As described above, in the solid-state imaging apparatus 104, it is possible to generate two kinds of potentials by one functional block using the PMOS transistor and NMOS transistor, and control the operation mode using the switching unit 18 (switch unit). With this arrangement, it is also possible to obtain the same effects as those in each of the above-described embodiments, thereby switching between the first mode and the second mode at high speed.

<Fourth Embodiment>

Figure 8:
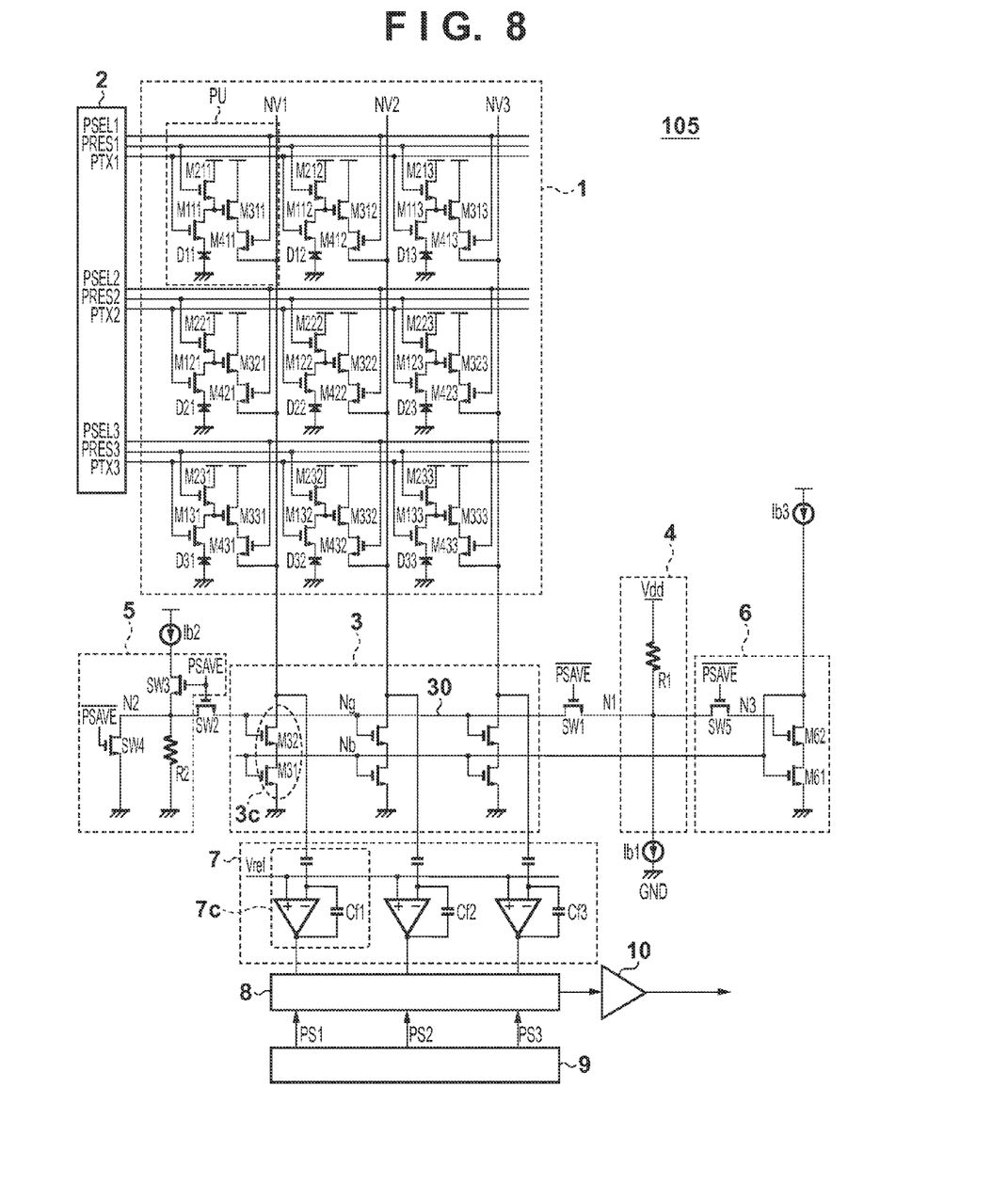
FIG. 8 is a circuit diagram for explaining a practical example of an arrangement according to the fourth embodiment.

A solid-state imaging apparatus 105 according to the fourth embodiment will be described with reference to FIG. 8. The fourth embodiment is different from the first embodiment in that units 4 and 5 generate a first potential $V_{CNT1}$ and second potential $V_{CNT2}$ using resistance elements, respectively. For example, polysilicon or the like need only be used for the resistance elements. If, for example, a power supply voltage VDD is set to 5 V and the current amount of a bias current source Ib1 is set to 100 µA, a first resistance element R1 of the unit 4 need only be arranged to have a resistance value of, for example, 30 kΩ. This enables the unit 4 to generate the first potential $V_{CNT1}$ (in this example, 2 V) at a node N1. In this case, immediately after the mode is switched from the second mode to the first mode, the potential of the node N1 becomes lower than the first potential $V_{CNT1}$, and a current of an amount corresponding to the potential flows through the first resistance element R1. If, for example, the potential of the node N1 is 1 V, a current of 200 µA flows through the first resistance element R1. As a result, the potential of the node N1 can return to the first potential $V_{CNT1}$ (in this example, 2 V).

If, for example, the current amount of a bias current source Ib2 is set to 50 µA, a second resistance element R2 of the unit 5 need only be arranged to have a resistance value of, for example, 16 kΩ. This enables the unit 5 to generate the second potential $V_{CNT2}$ (in this example, 0.8 V) at a node N2. In this case, immediately after the mode is switched from the first mode to the second mode, the potential of the node N2 becomes higher than the second potential $V_{CNT2}$, and a current of an amount corresponding to the potential flows through the second resistance element R2. If, for example, the potential of the node N2 is 2 V, a current of 125 µA flows through the second resistance element R2. As a result, the potential of the node N2 can return to the second potential $V_{CNT2}$ (in this example, 0.8 V). As described above, in this embodiment, it is also possible to obtain the same effects as those in the first embodiment, thereby switching between the first mode and the second mode. Furthermore, since resistance elements are used instead of MOS transistors, it is possible to reduce manufacturing variations.

<Fifth Embodiment>

Figure 9:
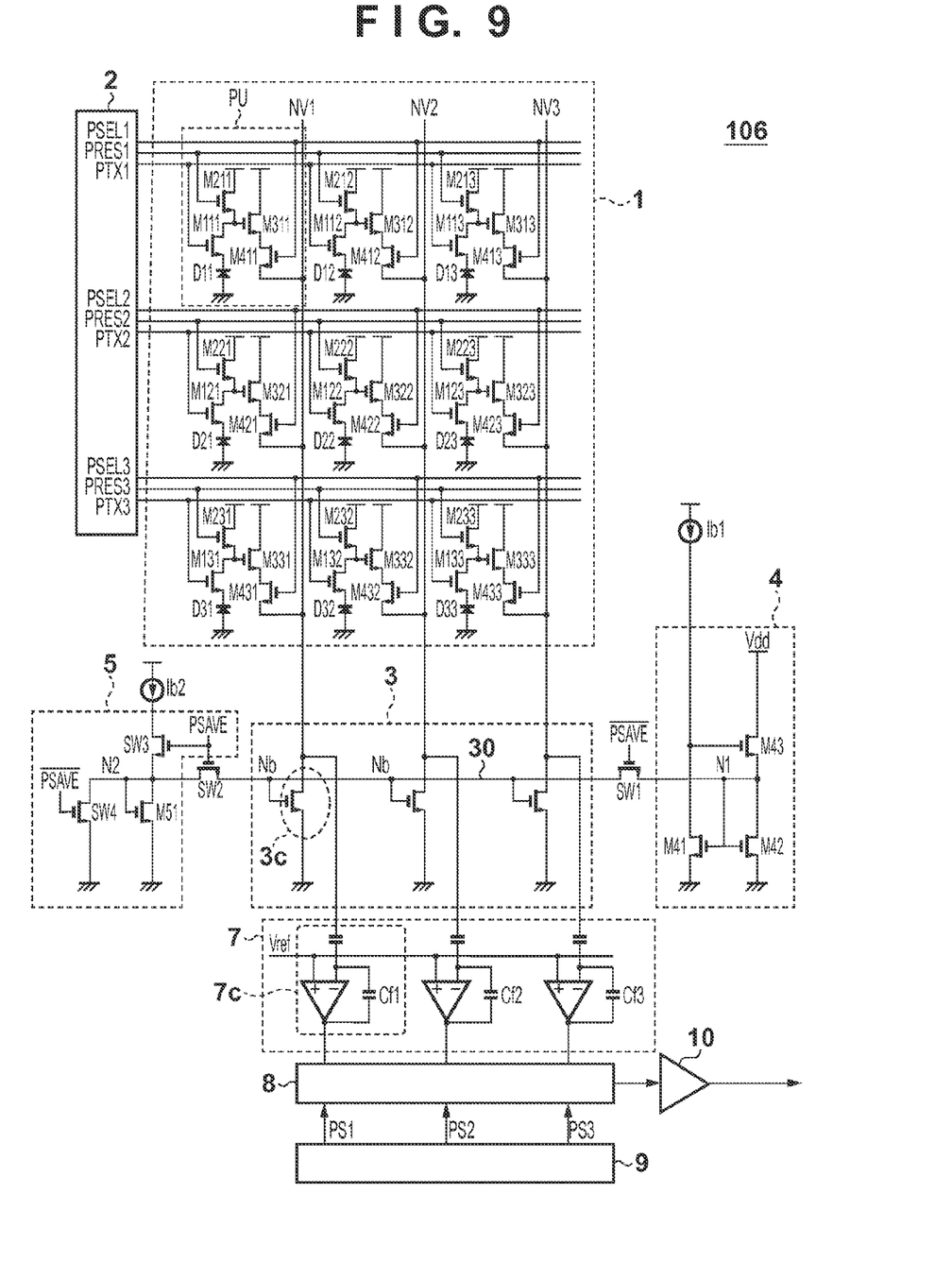
FIG. 9 is a circuit diagram for explaining a practical example of an arrangement according to the fifth embodiment.

A solid-state imaging apparatus 106 according to the fifth embodiment will be described with reference to FIG. 9. The arrangement of a column current source 3 in this embodiment is different from that in the first embodiment. In the first embodiment, the column current source 3 is formed by configuring the current source 3c arranged to correspond to each column by cascode-connecting a plurality of MOS transistors. However, as in this embodiment, it is not necessary to adopt such cascode connection configuration. A unit 4 generates, for example, a potential of about 1.5 V as a first potential $V_{CNT1}$, and a unit 5 generates, for example, a potential of about 1 V as a second potential $V_{CNT2}$. As described above, in this embodiment, it is also possible to obtain the same effects as those in the first embodiment, and the layout area may be suppressed without arranging the unit 6 by adopting the above arrangement.

<Sixth Embodiment>

Figure 10:
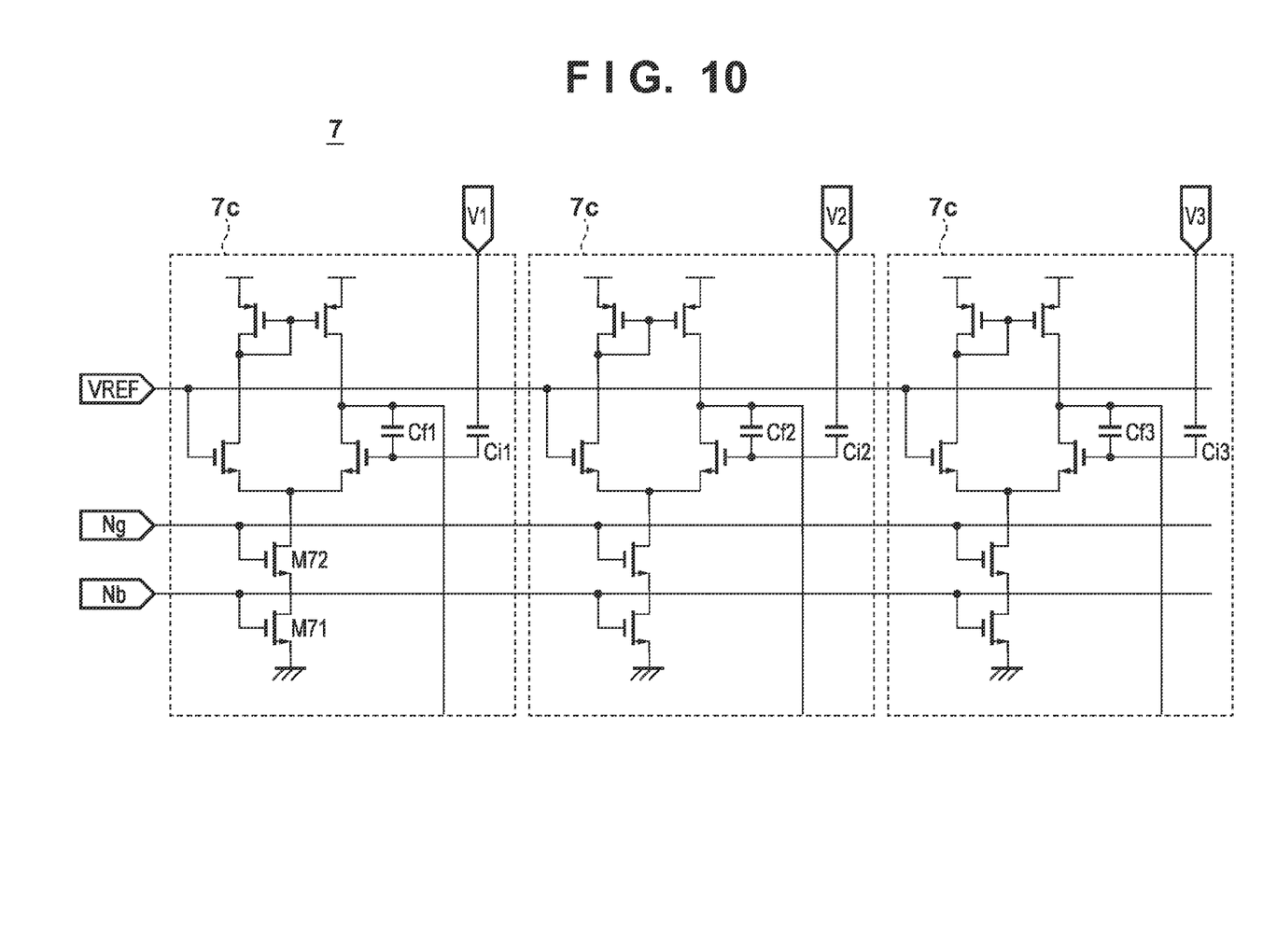
FIG. 10 is a circuit diagram for explaining a practical example of an arrangement according to the sixth embodiment.

The sixth embodiment will be described with reference to FIG. 10. As exemplified in FIG. 10, in each column amplifier 7c of a column amplifier group 7, a current source (second current source) connected to a differential amplifying circuit may be configured by cascode-connecting a plurality of MOS transistors. Using the current source configured by cascode-connection can suppress a change in current value in each column amplifier 7c, which is advantageous in suppressing a smear and ensuring linearity. In this example, the current source of each column amplifier 7c is configured by cascode-connecting MOS transistors M71 and M72. The MOS transistors M71 and M72 are arranged so that the gate terminal of the MOS transistor M71 is connected to a node Nb and the gate terminal of the MOS transistor M72 is connected to a node Ng, thereby adjusting a current in the first mode and the second mode. In the second mode, an idling current of, for example, about 0.5 µA is preferably supplied as a current flowing through the column amplifier 7c instead of 0 µA, thereby allowing quick transition from the second mode to the first mode. In the first mode, the value of a current flowing through the column amplifier 7c is, for example, about 2.5 to 10 µA.

As described above, according to this embodiment, it is possible to suppress a standby current in the second mode without arranging a switch transistor for the column amplifier 7c on each column, and further reduce the power consumption. In addition to the column amplifier 7c, the above-described arrangement may be applied to a sample signal buffer amplifier for a pipeline operation of performing a readout operation during a horizontal transferring period.

Although the six embodiments have been explained above, the present invention is not limited to them. The present invention can be appropriately changed in accordance with the purpose, state, application, function, and other specifications, and can also be implemented by another embodiment, as a matter of course. For example, a case in which the pixel array is formed as a CMOS image sensor has been described above. However, other sensors may be used. All or part of the operation of each of the above functional blocks may be controlled by an OS or the like running on a computer, together with or instead of a controller.

In each of the above embodiments, the solid-state imaging apparatus included in a camera has been described. The concept of the camera includes not only an apparatus whose main purpose is imaging, but also an apparatus (for example, a personal computer or portable terminal) having an imaging function as an auxiliary function. The camera can include the solid-state imaging apparatus according to the present invention exemplified as the above-mentioned embodiments, and a processing unit that processes a signal output from the solid-state imaging apparatus. This processing unit can include, for example, an A/D converter, and a processor that processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-100703, filed May 10, 2013, which is hereby incorporated by reference herein in its entirety.

What is claimed is:

1. A solid-state imaging apparatus, comprising:
   a pixel array in which a plurality of pixel units are arranged to form a plurality of rows and a plurality of columns;
   a plurality of column signal lines, arranged to respectively correspond to the plurality of columns, each configured to read out a signal from each pixel unit in the corresponding column;
   a plurality of current sources, arranged to respectively correspond to the plurality of column signal lines, including a plurality of controlling terminals and being configured to supply currents corresponding to potentials of the plurality of controlling terminals to the plurality of column signal lines, respectively;
   a control signal line is commonly connected to the plurality of controlling terminals;
   a first potential generation unit configured to generate a first potential;
   a second potential generation unit configured to generate a second potential different from the first potential;
   a first switch unit configured to, in a first mode in which a signal readout operation from the pixel array is performed, connect an output of the first potential generation unit to the control signal line and to set the plurality of controlling terminals to the first potential; and
   a second switch unit configured to, in a second mode in which the signal readout operation is paused, connect an output of the second potential generation unit to the control signal line and to set the plurality of controlling terminals to the second potential,
   wherein, before the potential of the plurality of controlling terminals reaches the first potential, the first potential generation unit supplies, to the control signal line via the first switch unit, a current larger than a current supplied after the potential reaches the first potential, and
   wherein, before the potential of the plurality of controlling terminals reaches the second potential, the second potential generation unit supplies, to the control signal line via the second switch unit, a current larger than a current supplied after the potential reaches the second potential.

2. The apparatus according to claim 1, wherein the first potential generation unit is arranged at one end of the control signal line, and the second potential generation unit is arranged at the other end of the control signal line.

3. The apparatus according to claim 2, wherein one of the first potential generation unit and the second potential generation unit is formed by a PMOS transistor and a current source, and the other of the first potential generation unit and the second potential generation unit is formed by an NMOS transistor and a current source.

4. The apparatus according to claim 1, wherein one of a PMOS transistor and an NMOS transistor is used as a transistor forming each of the pixel array, the plurality of current sources, the first potential generation unit, and the second potential generation unit.

5. The apparatus according to claim 4, wherein each of the first potential generation unit and the second potential generation unit includes an amplifying circuit.

6. The apparatus according to claim 5, wherein the first potential generation unit forms a source follower circuit, and the second potential generation unit forms a source ground circuit.

7. The apparatus according to claim 1, wherein the first potential generation unit and the second potential generation unit generate the first potential and the second potential, respectively, using both constant current sources and resistance elements.

8. The apparatus according to claim 1, wherein each of the plurality of current sources is configured by cascode-connecting a plurality of MOS transistors, and each of the plurality of controlling terminals includes a gate terminal of at least one of the plurality of MOS transistors.

9. The apparatus according to claim 1, wherein each of the plurality of current sources is configured by one MOS transistor, and each of the plurality of controlling terminals includes a gate terminal of the MOS transistor.

10. The apparatus according to claim 1, further comprising
    a plurality of column amplifiers arranged to respectively correspond to the plurality of columns, each configured to amplify the signal from each pixel unit in the corresponding column via the corresponding column signal line,
    wherein each of the plurality of column amplifiers includes a differential amplifying circuit and a second current source configured to supply a current to the differential amplifying circuit, and
    the second current source supplies a current of an amount corresponding to one of the first potential and the second potential supplied via the switch unit.

11. The apparatus according to claim 1, wherein the signal from each pixel unit includes a first signal including a noise component, and a second signal including a noise component and a component corresponding to light incident on the pixel unit.

12. A camera comprising:
a solid-state imaging apparatus comprising:
- a pixel array in which a plurality of pixel units are arranged to form a plurality of rows and a plurality of columns;
- a plurality of column signal lines, arranged to respectively correspond to the plurality of columns, each configured to read out a signal from each pixel unit in the corresponding column;
- a plurality of current sources, arranged to respectively correspond to the plurality of column signal lines, including a plurality of controlling terminals and being configured to supply currents corresponding to potentials of the plurality of controlling terminals to the plurality of column signal lines, respectively;
- a control signal line is commonly connected to the plurality of controlling terminals;
- a first potential generation unit configured to generate a first potential;
- a second potential generation unit configured to generate a second potential different from the first potential;
- a first switch unit configured to, in a first mode in which a signal readout operation from the pixel array is performed, connect an output of the first potential generation unit to the control signal line and to set the plurality of controlling terminals to the first potential; and
- a second switch unit configured to, in a second mode in which the signal readout operation is paused, connect an output of the second potential generation unit to the control signal line and to set the plurality of controlling terminals to the second potential; and
a processing unit configured to process a signal output from the solid-state imaging apparatus,
wherein, before the potential of the plurality of controlling terminals reaches the first potential, the first potential generation unit supplies, to the control signal line via the first switch unit, a current larger than a current supplied after the potential reaches the first potential, and
wherein, before the potential of the plurality of controlling terminals reaches the second potential, the second potential generation unit supplies, to the control signal line via the second switch unit, a current larger than a current supplied after the potential reaches the second potential.

13. The apparatus according to claim 1, wherein
the first potential generation unit includes a first element configured to supply a current which corresponds to a potential of a first node,
the second potential generation unit includes a second element configured to supply a current which corresponds to a potential of a second node,
(a) in transitioning from the second mode to the first mode,
the first switch unit turns ON and the second switch unit turns OFF, and
a current flowing through the first element becomes larger, in response to a potential of the control signal line transferring to the first node via the first switch unit, than that before transitioning from the second mode to the first mode, and
(b) in transitioning from the first mode to the second mode,
the first switch unit turns OFF and the second switch unit turns ON, and
a current flowing through the second element becomes larger, in response to a potential of the control signal line transferring to the second node via the second switch unit, than that before transitioning from the first mode to the second mode.

14. The apparatus according to claim 13, wherein,
(a) in transitioning from the second mode to the first mode, the first potential generation unit supplies, to the control signal line via the first switch unit, the current larger than that when the potential reaches the first potential, and
(b) in transitioning from the first mode to the second mode, the second potential generation unit supplies, to the control signal line via the second switch unit, the current larger than that after the potential reaches the second potential.

15. The apparatus according to claim 1, further comprising a plurality of column amplifiers, arranged to respectively correspond to the plurality of columns, each configured to amplify the signal from each pixel unit in the corresponding column via the corresponding column signal line,
wherein each of the plurality of column amplifiers includes a differential amplifier, a feedback capacitor arranged between an input of the differential amplifier and an output of the differential amplifier, and an input capacitor arranged between the input of the differential amplifier and the corresponding column signal line.

* * * * *